United States Patent
Takaki et al.

(10) Patent No.: US 12,546,687 B2
(45) Date of Patent: Feb. 10, 2026

(54) IMMUNOSTAINING METHOD, SAMPLE EXCHANGE CHAMBER, AND CHARGED PARTICLE BEAM APPARATUS

(71) Applicants: Showa University, Tokyo (JP); Hitachi High-Tech Corporation, Tokyo (JP)

(72) Inventors: Takashi Takaki, Tokyo (JP); Yoshihiro Nagase, Tokyo (JP); Dedong Kang, Tokyo (JP); Kazuho Honda, Tokyo (JP); Mari Sakaue, Tokyo (JP); Megumi Nakamura, Tokyo (JP)

(73) Assignees: Showa University, Tokyo (JP); Hitachi High-Tech Corporation, Tokyo (JP)

( * ) Notice: Subject to any disclaimer, the term of this patent is extended or adjusted under 35 U.S.C. 154(b) by 344 days.

(21) Appl. No.: 18/039,446

(22) PCT Filed: Nov. 30, 2020

(86) PCT No.: PCT/JP2020/044477
§ 371 (c)(1),
(2) Date: May 30, 2023

(87) PCT Pub. No.: WO2022/113336
PCT Pub. Date: Jun. 2, 2022

(65) Prior Publication Data
US 2024/0019346 A1    Jan. 18, 2024

(51) Int. Cl.
*G01N 1/31*    (2006.01)
*H01J 37/20*    (2006.01)
(Continued)

(52) U.S. Cl.
CPC .............. *G01N 1/31* (2013.01); *H01J 37/20* (2013.01); *G01N 2001/305* (2013.01); *H01J 37/28* (2013.01); *H01J 2237/204* (2013.01)

(58) Field of Classification Search
CPC ............ G01N 1/31; G01N 1/312; G01N 1/34; G01N 33/48; G01N 33/53; H01J 37/185;
(Continued)

(56) References Cited

U.S. PATENT DOCUMENTS 7,977,631 B2 * 7/2011 Mulders ............... G01N 23/225
250/311
2005/0173632 A1    8/2005 Behar et al.
(Continued)

FOREIGN PATENT DOCUMENTS

CN    103155089 A    6/2013
JP    8-335449 A    12/1996
(Continued)

OTHER PUBLICATIONS

Chinese-language Office Action issued in Chinese Application No. 202080107489.6 dated Jun. 20, 2024 with English translation (15 pages).
(Continued)

*Primary Examiner* — Jason L Mccormack
(74) *Attorney, Agent, or Firm* — Crowell & Moring LLP

(57) ABSTRACT

In order to enable use of novel immunostaining for a pathological diagnosis and research, the invention provides a sample exchange chamber including: a container 2 into which a substrate on which a sample is placed can be introduced; a specific solution inlet 3, which is a staining mechanism that stains the sample; a cleaning liquid inlet 4, which is a cleaning mechanism that cleans the sample; an evacuation port 5, which is an evacuation mechanism that evacuates the container; a drain port 6; and a sterilization mechanism 7 that sterilizes the sample and inside of the container.

4 Claims, 4 Drawing Sheets

(51) Int. Cl.
*G01N 1/30* (2006.01)
*H01J 37/28* (2006.01)

(58) Field of Classification Search
CPC .. H01J 37/20; H01J 37/26; H01J 37/28; H01J 37/00; H01J 37/02; H01J 2237/2004; H01J 2237/204; H01J 2237/28
USPC ................................ 250/306, 307, 310, 311
See application file for complete search history.

(56) References Cited

U.S. PATENT DOCUMENTS

| | | |
|---|---|---|
| 2009/0042219 A1 | 2/2009 | Moriyama et al. |
| 2012/0260936 A1* | 10/2012 | Vane .................... B08B 7/0057 250/431 |
| 2013/0193343 A1 | 8/2013 | Nagakubo et al. |

FOREIGN PATENT DOCUMENTS

| | | |
|---|---|---|
| JP | 2005-529341 A | 9/2005 |
| JP | 2009-80108 A | 4/2009 |
| JP | 2017-201289 A | 11/2017 |
| JP | 2018-92952 A | 6/2018 |
| WO | WO 2008/044351 A1 | 4/2008 |

OTHER PUBLICATIONS

International Search Report (PCT/ISA/210) issued in PCT Application No. PCT/JP2020/044477 dated Feb. 2, 2021 with English translation (four (4) pages).

Japanese-language Written Opinion (PCT/ISA/237) issued in PCT Application No. PCT/JP2020/044477 dated Feb. 2, 2021 (three (3) pages).

* cited by examiner

[FIG. 1]
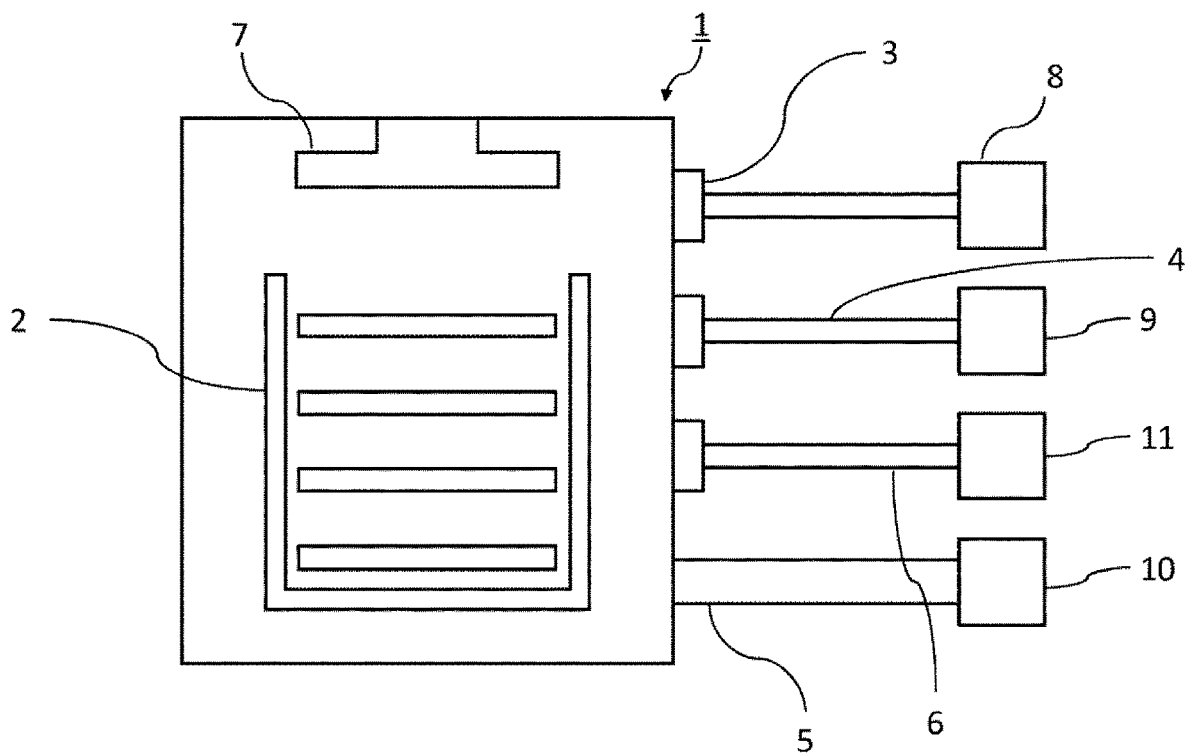
[FIG. 2]
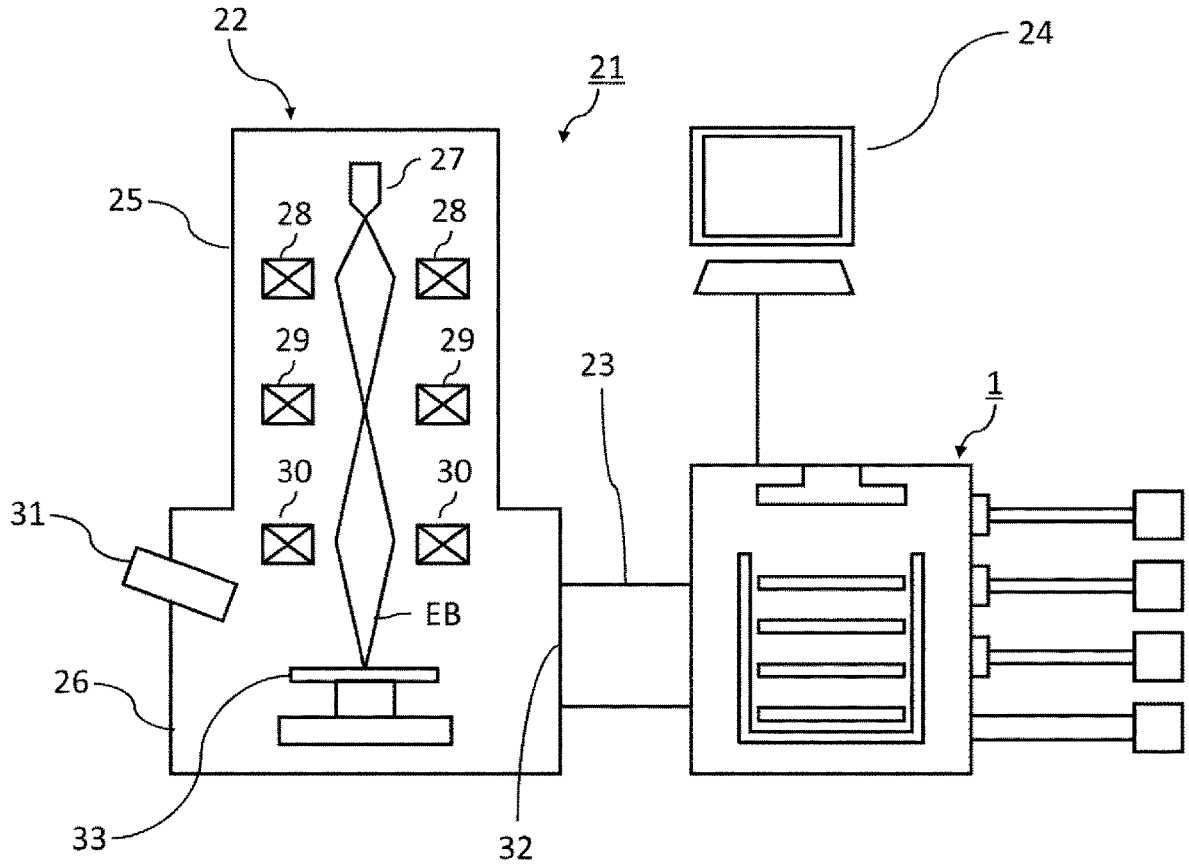

[FIG. 3]
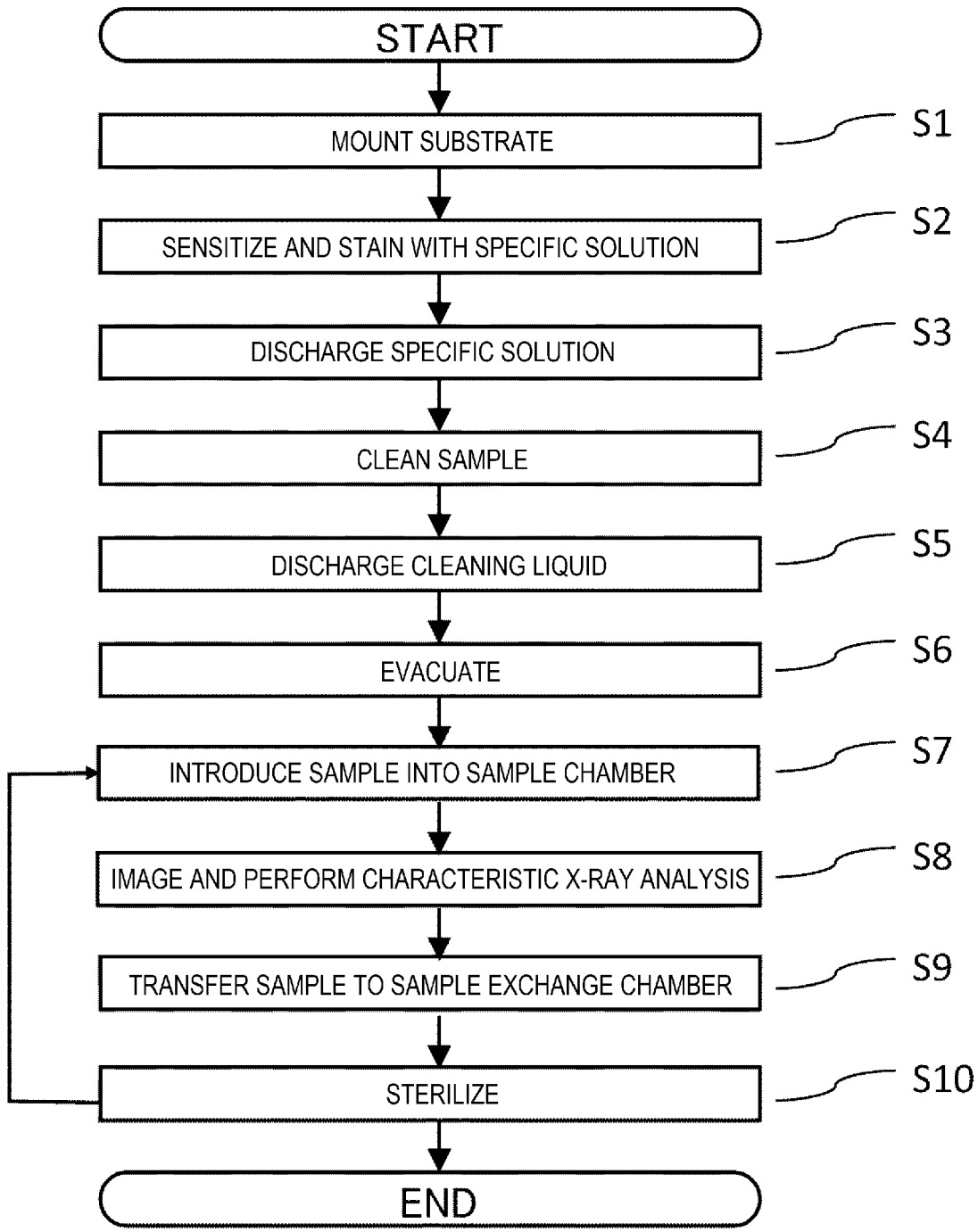

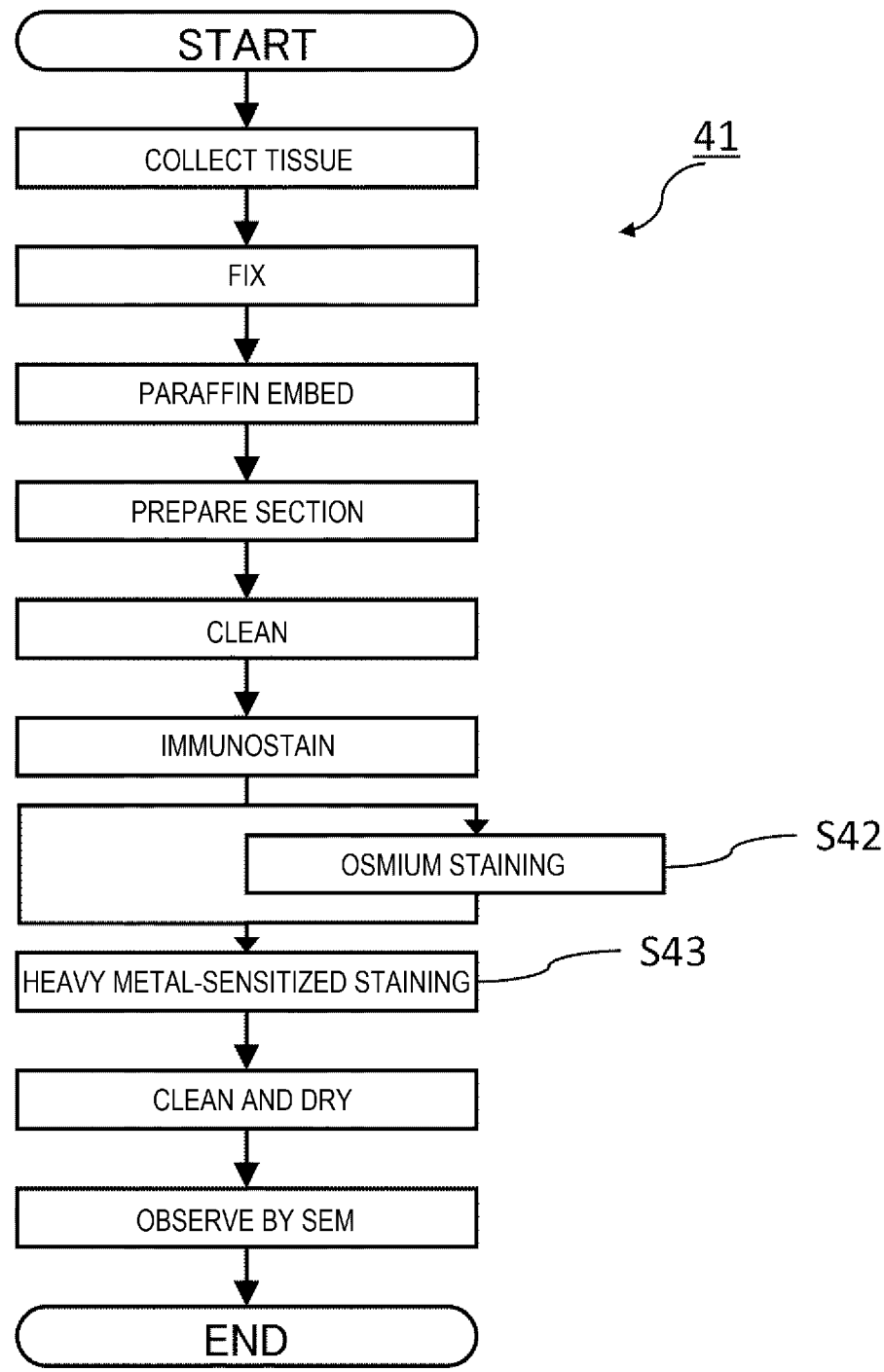
[FIG. 4]

FIG. 5A
RELATED ART
FIG. 5B
NOVEL METHOD
FIG. 5C
CONTROL
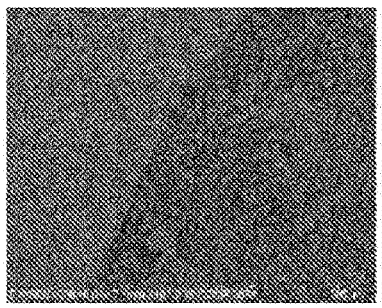
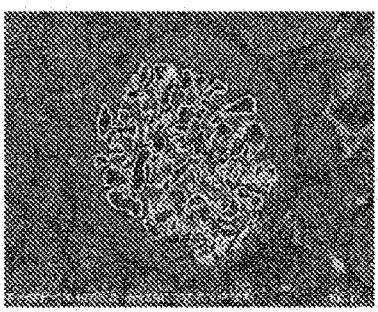
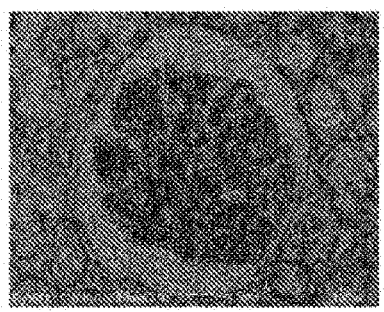
FIG. 6A
FIG. 6B
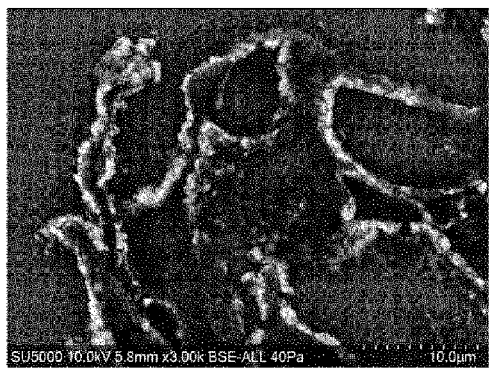
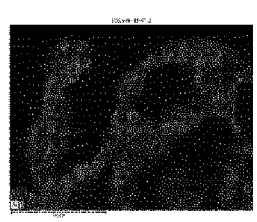
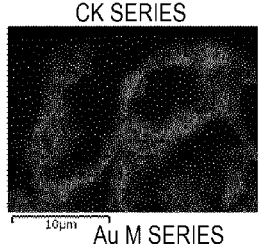
CK SERIES
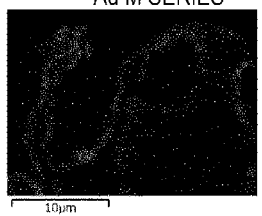
Au M SERIES

IMMUNOSTAINING METHOD, SAMPLE EXCHANGE CHAMBER, AND CHARGED PARTICLE BEAM APPARATUS

TECHNICAL FIELD

The present invention relates to an immunostaining method, a sample exchange chamber including a staining mechanism, and a charged particle beam apparatus.

BACKGROUND ART

In a pathological diagnosis, a biological tissue is prepared into a formalin fixed paraffin embedded (FFPE) sample, a target cell component is stained using various staining methods, and the tissue is identified and diagnosed by a difference between a form and a color tone. An immunostaining method, which is one of the staining methods, is a procedure for identifying functions of the tissue and organelles by visualizing expression of specific genes and various marker proteins mainly using an antigen-antibody reaction which is a specific reaction between an antigen substance such as protein and an antibody, and is necessary for a pathological diagnosis and research.

Although an immunoelectron microscope method to which this procedure is applied has a very high demand, since the immunoelectron microscope method depends on a resolution of a microscope, a transmission electron microscope (TEM) is mainly used. The TEM has a high resolution, is suitable for observing a structure of fine cells, and is used in the pathological diagnosis and research, but large facilities and high budgets are required, and thus the number of institutions that can own the TEM is limited. Complicated pretreatment such as preparation of an ultrathin section takes time and labor, and an observation image is displayed in black and white since an electron beam is used as a radiation source, and thus the cell component cannot be identified by color as in the case of an optical microscope. For this reason, understanding the observation image requires specialized knowledge and a proficiency level.

Thus, there are many problems when using the TEM for the pathological diagnosis, and in order to solve these problems, a method of performing the pathological diagnosis by observing the FFPE sample for the optical microscope with a scanning electron microscope (SEM), which is less expensive than the TEM and can be used in a reduced space, has been expected in recent years. Along with this, a demand for immunoelectron microscopy using the SEM is also increasing, and a simpler method that can support a pathological diagnosis is required. As a related art, for example, PTL 1 discloses an SEM that generates an enlarged image of a surface of a sample disposed in air.

CITATION LIST

Patent Literature

PTL 1: JP2018-92952A

SUMMARY OF INVENTION

Technical Problem

Although there is a fairly high demand for the immunoelectron microscopy, the immunoelectron microscopy is not general for the following two reasons.

(1) Fixatives, clearing agents, activation methods, and the like for use in optical microscope sample preparation and immunostaining are limited in reagents to be used due to deterioration of the form retention of a microstructure of a tissue important for observation of an electron microscope.

(2) A pre-fixative, a post-fixative, and an epoxy resin for use in preparation of an electron microscope sample for better retention of the microstructure lower antigenicity of the sample and inhibit an immune reaction.

The immunoelectron microscopy that improves the above problems includes two methods including a method of observing, with the TEM, osmium black, which is generated by using horseradish peroxidase (HRP) as a labeled antibody of a target antigen, developing DAB of a positive site of the target antigen, and further reacting with osmium, and a method of observing gold particles at the positive site with the TEM or the SEM, although not common, using a secondary antibody labeled with gold particles of about 5 nm to 15 nm. However, in both cases, the procedure is complicated and the stability of staining is weak as compared with normal immunostaining. It is difficult for the SEM to observe osmium black and microscopic gold particles.

In order to solve the above problems, an object of the invention is to enable simpler and more stable novel immunostaining for pathological diagnosis and research using an SEM which is less expensive than a TEM and can be used in a reduced space.

Solution to Problem

In order to achieve the above object, the invention provides a sample exchange chamber for use in a charged particle beam apparatus based on development of a novel immunostaining method, the sample exchange chamber includes: a container into which a substrate on which a sample is placed can be introduced; a staining mechanism configured to stain the sample; a cleaning mechanism configured to clean the sample; an evacuation mechanism configured to evacuate the container; and a sterilization mechanism configured to sterilize the sample and inside of the container.

In order to achieve the above object, the invention provides charged particle beam apparatus, the charged particle beam apparatus includes: a sample chamber; a sample exchange chamber including a container into which a substrate on which a sample is placed can be introduced, a staining mechanism configured to stain the sample, a cleaning mechanism configured to clean the sample, an evacuation mechanism configured to evacuate the container, and a sterilization mechanism configured to sterilize the sample and inside of the container; and an autoloader mechanism configured to transfer the sample between the sample exchange chamber and the sample chamber without exposing the sample to air.

Advantageous Effects of Invention

According to the invention, operations related to staining, observation by an SEM, characteristic X-ray analysis, and result analysis can be automatically performed in a sample chamber.

BRIEF DESCRIPTION OF DRAWINGS

FIG. 1 is a diagram showing a configuration example of a sample exchange chamber according to Embodiment 1.

FIG. 2 is a schematic diagram showing a configuration example of a charged particle beam apparatus according to Embodiment 1.

FIG. 3 is a flowchart showing an operation of the charged particle beam apparatus according to Embodiment 1.

FIG. 4 is a flowchart showing a procedure of a novel staining method according to Embodiment 1.

FIGS. 5A to 5C are diagrams showing an example of staining of a pathological section according to Embodiment 1.

FIGS. 6A and 6B are diagrams showing a result of characteristic X-ray analysis of a pathological section stained by the staining method according to Embodiment 1.

DESCRIPTION OF EMBODIMENTS

Hereinafter, an embodiment will be described in detail with reference to the drawings. In all the drawings for showing the embodiment, members having the same function are denoted by the same reference numerals, and repeated description thereof is omitted. In the following description of the embodiment, a description of the same or similar portions is not repeated in principle unless otherwise particularly necessary.

Embodiment 1

Embodiment 1 is an embodiment of a sample exchange chamber and a charged particle beam apparatus using the sample exchange chamber. The sample exchange chamber includes: a container into which a substrate on which a sample is placed can be introduced; a staining mechanism that stains the sample; a cleaning mechanism that cleans the sample; an evacuation mechanism that evacuates the container; and a sterilization mechanism that sterilizes the sample and the inside of the container.

FIG. 1 is a configuration diagram of the sample exchange chamber for use in the charged particle beam apparatus according to Embodiment 1. A sample exchange chamber 1 includes a container 2, a specific solution inlet 3 with a tube, a cleaning liquid inlet 4, an evacuation port 5, a drain port 6, and a sterilization mechanism 7. The sample exchange chamber 1 also includes a control circuit that controls each component, but illustration thereof is omitted here. The specific solution inlet 3 constitutes a staining mechanism that stains the sample. The cleaning liquid inlet 4 constitutes a cleaning mechanism that cleans the sample. The evacuation port 5 constitutes an evacuation mechanism that evacuates the container. The sterilization mechanism 7 is a sterilization mechanism that sterilizes the sample and the inside of the container.

The container 2 is, for example, a cassette container having a structure into which a plurality of substrates on which samples are placed can be introduced. The container 2 holds a sufficient space into which the samples placed on the substrates do not come into contact with the container 2 or another substrate when the substrates are introduced.

The specific solution inlet 3 with a tube is openable and closable, and is connected to the sample exchange chamber 1 or the container 2. A specific solution is, for example, a heavy metal such as silver or gold used for a sensitization reaction of the sample. As shown in FIG. 1, the tube is connected to the specific solution inlet 3, and the other end of the tube is attached to a specific solution container 8 installed outside the sample exchange chamber 1. A sufficient amount of the specific solution for staining the sample in the container 2 can be introduced into the sample exchange chamber 1 or the container 2 through the tube.

Similar to the specific solution inlet 3, the cleaning liquid inlet 4 with a tube is openable and closable, and is connected to the sample exchange chamber 1 or the container 2. The cleaning liquid is, for example, water. The tube is connected to the cleaning liquid inlet 4, and the other end of the tube is attached to a cleaning liquid container 9 installed outside the sample exchange chamber 1. The cleaning liquid is introduced into the sample exchange chamber 1 or the container 2 through the tube, and the specific solution on the sample is washed away.

The evacuation port 5 is connected to a pump 10 outside the sample exchange chamber 1 in order to evacuate the sample exchange chamber 1. The drain port 6 with a tube is connected to a waste liquid container 11 outside the sample exchange chamber 1. The drain port 6 can discharge the specific solution or the cleaning liquid from the sample exchange chamber 1 or the container 2 to the waste liquid container 11.

The sterilization mechanism 7 is, for example, an ultraviolet (UV) irradiation machine that is attached to the inside of the sample exchange chamber 1 and has a function of sterilizing the inside of the sample exchange chamber 1. When the sample contains a toxic virus, the virus may not fall in activity even after immobilization, but the air and the charged particle beam apparatus are not exposed to the virus because the virus can be sterilized in the sample exchange chamber 1. That is, it is possible to reduce the possibility that a virus that cannot be inactivated due to immobilization affects an operator or the like.

FIG. 2 is a diagram showing a state in which the sample exchange chamber 1 according to the present embodiment shown in FIG. 1 is applied to a charged particle beam apparatus 21. The charged particle beam apparatus 21 can be implemented as, for example, a scanning electron microscope (SEM) that captures an observation image of a sample. A section sample in the scanning electron microscope has a sufficient thickness of about several μm for an optical microscope, and thus the section is easily produced. Therefore, the pretreatment can be performed more easily and quickly.

As shown in FIG. 2, the charged particle beam apparatus 21 includes a main body 22, the sample exchange chamber 1, an autoloader mechanism 23, and a control device 24.

The main body 22 is formed by integrating a lens barrel and a sample chamber 26. The lens barrel 25 includes an electron gun 27, a condenser lens 28, a deflection coil 29, and an objective lens 30. Each of the condenser lens 28 and the objective lens 30 is an electromagnetic stone having a coil, and functions as a lens in which an electromagnetic field generated from each of the condenser lens 29 and the objective lens 30 gives a focusing action to an electron beam radiated from the electron gun 27 to form an electron beam EB. The lens barrel 25 also includes a control circuit that controls each component, but the illustration thereof is omitted here.

By irradiating a sample on a sample stage 33 with the electron beam EB, for example, secondary electrons, reflected electrons, characteristic X-rays, and the like are generated. A detector 31 is disposed at an appropriate position in the lens barrel 25 or the sample chamber 26, and detects each signal.

The sample chamber 26 includes an openable and closable inlet/outlet port 32, and has a structure in which the sample stage 33 is accommodated. The sample is placed on the sample stage 33.

The autoloader mechanism 23 is connected to the inlet/outlet port 32 of the sample chamber 26. The autoloader mechanism 23 is further connected to the sample exchange chamber 1. The autoloader mechanism 23 has a mechanism capable of transferring the sample from the sample exchange chamber 1 to the sample chamber 26 and from the sample chamber 26 to the sample exchange chamber 1 without exposing the sample to air. Since the autoloader mechanism 23 is also evacuated, when the sample is transferred between the sample chamber 26 and the sample exchange chamber 1, it is possible to shorten the time to evacuate and open to air.

The control device 24 includes, for example, a personal computer (PC), and has a function of controlling all operations in the main body 22, the sample exchange chamber 1, and the autoloader mechanism 23. For example, when a user performs setting in advance, adjustment of luminance and focus at the time of imaging, imaging, and characteristic X-ray analysis can be automatically performed for a plurality of samples, and positive sites can be identified simultaneously. In the sample exchange chamber 1, the presence or absence and the number of times of staining and cleaning, and the presence or absence and the timing of sterilization can be set and automatically performed.

FIG. 3 is a flowchart showing operations of the charged particle beam apparatus 21 from the introduction of the sample by the user to the imaging of the sample by the apparatus. Hereinafter, each step in FIG. 3 will be described.

(FIG. 3: Step S1)

The user mounts, on the container 2 inside the sample exchange chamber 1, the substrate on which the sample is placed. After the substrate is mounted, an instruction for the sample exchange chamber 1, the autoloader mechanism 23, and the charged particle beam apparatus 21 is input to the PC which is the control device 24, thereby enabling automation. The input instruction includes, for example, the presence or absence, order, time of staining, cleaning, and sterilization in the sample exchange chamber 1, imaging setting, and identification of positive sites by characteristic X-ray analysis.

(FIG. 3: Steps S2 and S3)

The sample exchange chamber 1 injects the specific solution into the sample exchange chamber 1 or the container 2 to sensitize and stain the sample in accordance with the instruction input by the user (step S2). The specific solution is discharged from the drain port 6 after the staining is completed (step S3).

(FIG. 3: Steps S4 and S5)

The sample exchange chamber 1 injects the cleaning liquid into the sample exchange chamber 1 or the container 2 to clean the sample in accordance with the instruction input by the user (step S4). The cleaning liquid is discharged from the drain port 6 after the cleaning is completed (step S5).

(FIG. 3: Step S6)

The sample exchange chamber 1 is evacuated.

(FIG. 3: Step S7 to S10)

A plurality of samples in the sample exchange chamber 1 are sequentially introduced one by one into the sample chamber 26 by the autoloader mechanism 23 and placed on the sample stage 33 (step S7). The charged particle beam apparatus 21 images the sample and performs characteristic X-ray analysis on the sample in accordance with the instruction such as an imaging range or an imaging condition input in advance by the user (step S8).

The sample for which the imaging and the analysis are completed is transferred from the sample chamber 26 to the sample exchange chamber 1 by the autoloader mechanism 23, and is returned to an original position in the container 2 (step S9). The sterilization mechanism 7 sterilizes the sample (step S10). The sample is sterilized in the sample exchange chamber 1 for sufficient time (set in step S1) enough for a toxic or infectious virus to become inactive. The sterilization in step S10 can be performed in the sample exchange chamber 1 before the sample is introduced into the sample chamber 26. Thereafter, steps S7 to S10 are repeated until the imaging of the number of samples instructed by the user is completed.

In the present embodiment, since the sample exchange chamber 1, the autoloader mechanism 23, and the charged particle beam apparatus main body 22 are integrated, all operations from staining to imaging can be automatically performed. That is, staining, cleaning, introduction of the sample, imaging, and derivation of the sample, which have been performed by the user until now, can be automatically performed. Therefore, the number of processes performed by the user can be greatly reduced.

FIG. 4 is a flowchart of a novel staining method according to the present embodiment. The present inventors may refer to the novel staining method as a Takaki method. That is, the sample is immunostained, and the immunostained sample is subjected to heavy metal-sensitized staining. A novel staining method 41 is a method similar to a general immunostaining method in which an HRP or the like in the related art is used as a labeled antibody of a target antigen from tissue collection to immunostaining, and a positive site thereof is colored with DAB.

Next, osmium staining S42 using 1% osmium tetroxide is performed as necessary, but this may be omitted. This step is used for strengthening an immune reaction.

In the heavy metal-sensitized staining S43, heavy metals such as Thiosemicarbazide, gold, silver, and sodium are combined and stained. For example, after being treated with 1% sodium metabisulfite for 1 minute (at room temperature), the sample is allowed to stand (at 60° C.) for 15 minutes in methenamine silver for sensitization. A concentration of methenamine silver used here is changed to an optimum concentration depending on an observation site. Thereafter, the sample is treated with gold chloride for 3 minutes (room temperature) and fixed with 5% sodium thiosulfate (1 minute). Finally, the sample is cleaned with water, dried, and imaged. By adding the heavy metal-sensitized staining S43, the positive site is sensitized. Further, a clear contrast capable of sufficiently determining the positive site can be obtained even by the SEM.

For example, in a case where a sample in which an area of the sensitized and stained site does not exceed a threshold continues in the imaged sample, when a setting to alert a stain failure is instructed, before imaging all the samples mounted on the sample exchange chamber 1, it is possible to return to a restaining operation, and prevent a loss of time. The area of the sensitized site can be automatically derived from a contrast difference of an image or a result of characteristic X-ray analysis.

The captured image is binarized by, for example, the PC constituting the control device 24 to obtain an area ratio of the positive site. The obtained area ratio can be used for disease determination, specific cell recognition, and virus presence or absence determination. For example, from the result of characteristic X-ray analysis of the sample, by displaying only an element used for sensitized staining, the sensitized and stained site can be identified. Accordingly, it is possible to determine a minute positive site that cannot be sensed by the optical microscope. Therefore, in the novel staining method 41 in FIG. 4, image analysis is possible, so determination is possible regardless of proficiency.

FIGS. 5A to 5C show an example of a pathological section stained by the novel staining method 41 in comparison with the case of a method in the related art. In a lower part of FIGS. 5A to 5C, a part of an upper part is enlarged. As shown in FIG. 5A it is difficult to stain only a target site by an osmium black method of the related art. Further, in the case of staining, a frequency of over-staining is high, and time and proficiency are required for the pretreatment. In the SEM, it is difficult to distinguish between the stained site and other sites.

However, as shown in FIG. 5B, in the novel staining method 41, the positive site is sensitized with a heavy metal, and is indicated by a bright color. As described above, in the case of the present embodiment, a clear contrast is obtained, and therefore, as shown in FIG. 5C, it is possible to easily visualize a tissue in a microcell subjected to the immune reaction.

FIGS. 6A and 6B are diagrams showing a result of characteristic X-ray analysis of the pathological section stained with the heavy metal-sensitized staining S43 of the novel staining method 41. FIG. 6A shows an image based on a reflected electron signal, and FIG. 6B shows an image in which a positive site is visualized by sensing gold used for sensitized staining by characteristic X-ray analysis. As described above, in the novel staining method 41, a minute positive site is also clear, and a quicker pathological diagnosis is possible.

According to the invention described above in detail, since operations related to staining, observation by SEM, characteristic X-ray analysis, and result analysis can be automatically performed in a sample chamber, the time and the number of processes required for the sample pretreatment can be reduced. By providing a mechanism that can sterilize the sample in the sample exchange chamber, it is possible to observe the sample without exposing the sample to air and the inside of the apparatus having a toxic or infectious virus.

According to the invention, each section can be made to have a thickness of about several μm, labor and proficiency required for preparing the section are not necessary, and a high contrast can be obtained by sensitizing a positive site with a heavy metal after immunostaining. In an immuno-electron microscopic observation using the SEM that has been difficult until now, an immunopositive reaction can be easily visualized. Further, by performing characteristic X-ray analysis on the same site, more accurate site identification of the positive site and quantification according to the area ratio can be performed.

REFERENCE SIGNS LIST 1 sample exchange chamber
2 container
3 specific solution inlet
4 cleaning liquid inlet
5 evacuation port
6 drain port
7 sterilization mechanism
8 specific solution container
9 cleaning liquid container
10 pump
11 waste liquid container
21 charged particle beam apparatus
22 main body
23 autoloader mechanism
24 control device
25 lens barrel
26 sample chamber
27 electron gun
28 condenser lens
29 deflection coil
30 objective lens
31 detector
32 inlet/outlet
33 sample stage
41 novel staining method

The invention claimed is:

1. A charged particle beam apparatus comprising:
   a sample chamber;
   a sample exchange chamber including
      a container into which a substrate on which a sample is placed can be introduced,
      a staining mechanism configured to stain the sample,
      a cleaning mechanism configured to clean the sample,
      an evacuation mechanism configured to evacuate the container, and
      a sterilization mechanism configured to sterilize the sample and inside of the container; and
   an autoloader mechanism configured to transfer the sample between the sample exchange chamber and the sample chamber without exposing the sample to air.

2. The charged particle beam apparatus according to claim 1, wherein
   the charged particle beam apparatus is a scanning electron microscope.

3. The charged particle beam apparatus according to claim 1, wherein
   the staining mechanism of the sample exchange chamber is capable of staining the immunostained sample with a heavy metal.

4. The charged particle beam apparatus according to claim 1, further comprising:
   a control device configured to control the sample chamber, the sample exchange chamber, and the autoloader mechanism, wherein
   the control device automatically transfers and images the sample.

* * * * *